(No Model.)

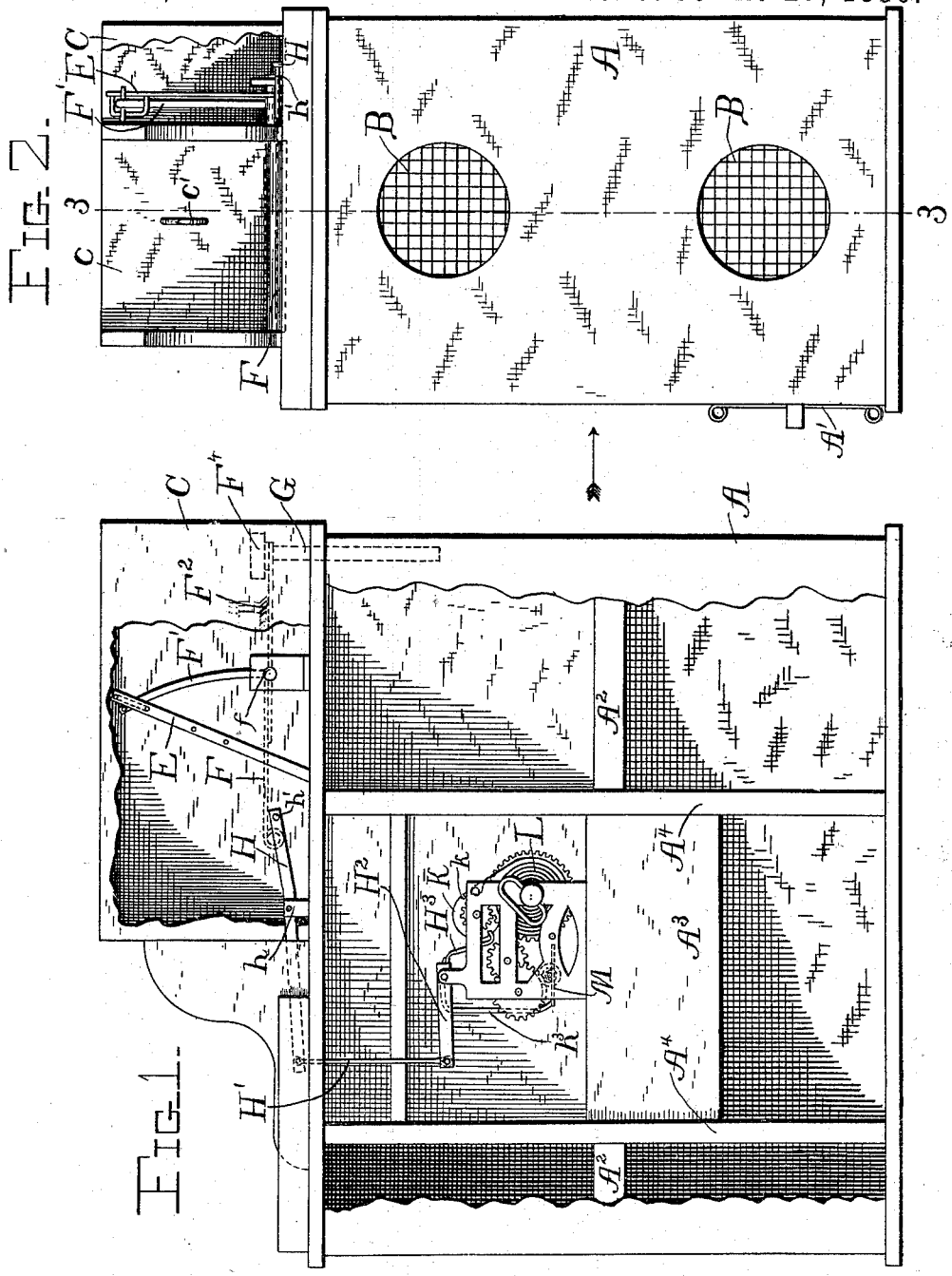

W. H. HARDEN.
ANIMAL TRAP.

No. 562,603.

Patented June 23, 1896.

3 Sheets—Sheet 2.

Witnesses
J. H. Holt.
D. H. Blakeloch.

Inventor
W. H. Harden,
by Whitman & Wilkinson,
Attorneys.

(No Model.) 3 Sheets—Sheet 3.
W. H. HARDEN.
ANIMAL TRAP.
No. 562,603. Patented June 23, 1896.
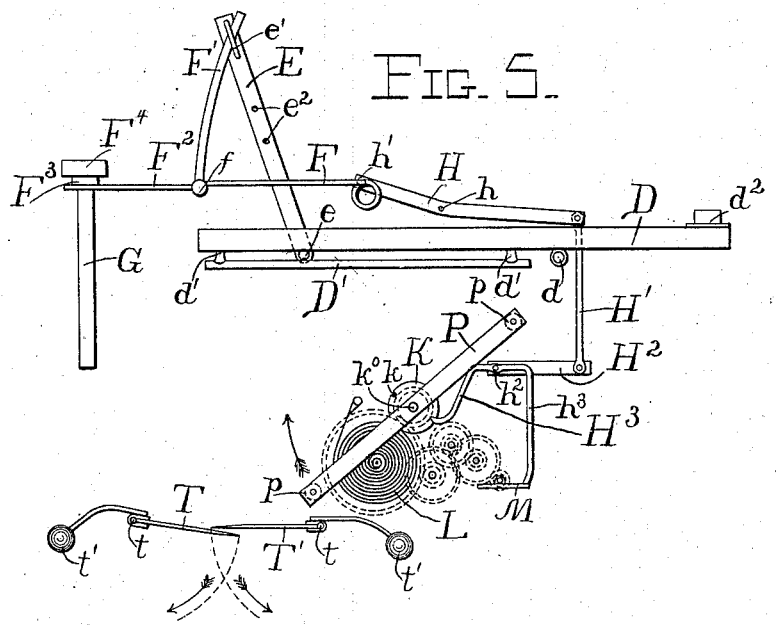
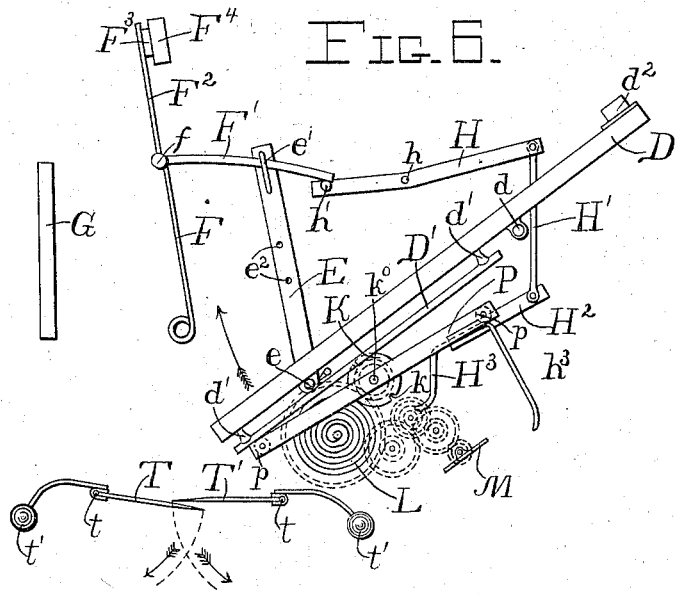
Witnesses
J. H. Holt.
D. H. Blakelock.
Inventor
W. H. Harden,
by Whitman & Wilkinson
Attorneys.

UNITED STATES PATENT OFFICE.

WILLIAM HAMILTON HARDEN, OF QUITMAN, GEORGIA, ASSIGNOR OF ONE-HALF TO OTIS F. GOODWIN, OF SAME PLACE.

ANIMAL-TRAP.

SPECIFICATION forming part of Letters Patent No. 562,603, dated June 23, 1896.

Application filed March 11, 1896. Serial No. 582,782. (No model.)

*To all whom it may concern:*

Be it known that I, WILLIAM HAMILTON HARDEN, a citizen of the United States, residing at Quitman, in the county of Brooks and State of Georgia, have invented certain new and useful Improvements in Animal-Traps; and I do hereby declare the following to be a full, clear, and exact description of the invention, such as will enable others skilled in the art to which it appertains to make and use the same.

My invention relates to improvements in animal-traps, and especially in traps intended to catch rats and like animals; and it consists in certain novel features hereinafter described and claimed.

Reference is had to the accompanying drawings, in which the same parts are indicated by the same letters throughout the several views.

Figure 3:
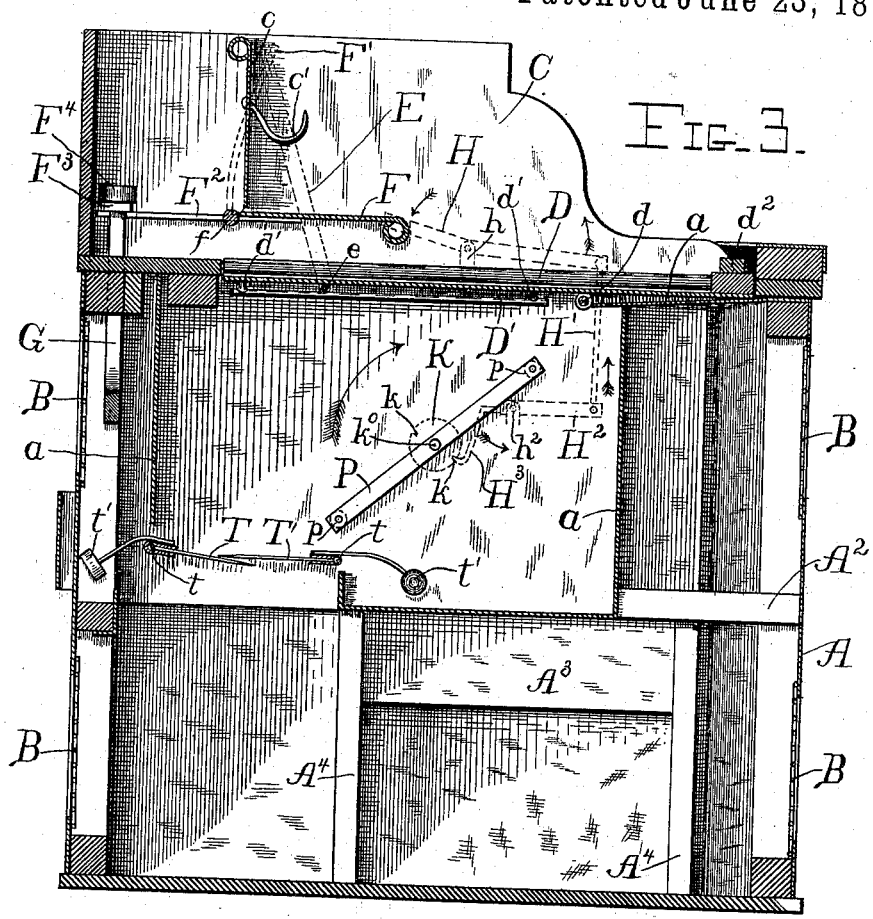
Figure 4:
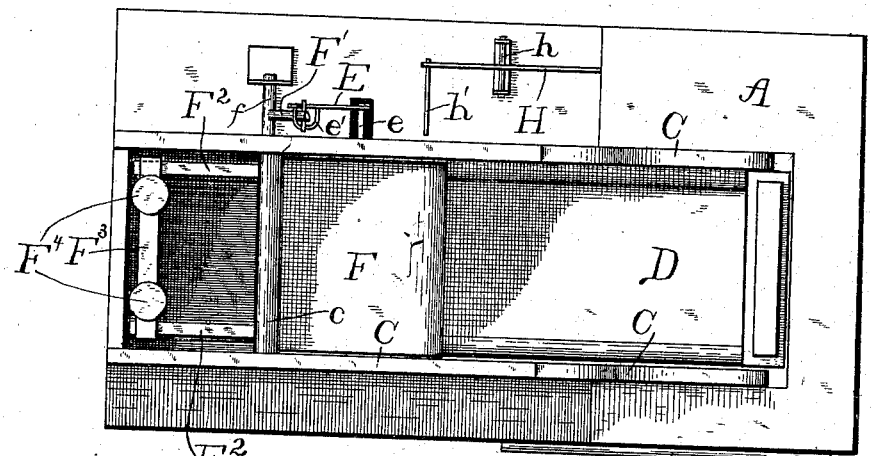

Figure 1 represents a side elevation of my improved trap, parts being broken away. Fig. 2 represents an end view of the said trap as seen from the left of Fig. 1. Fig. 3 represents a section along the line 3 3 in Fig. 2 and looking to the right. Fig. 4 represents a plan view of the improved trap; and Figs. 5 and 9 are diagrammatic views of the mechanism of the trap when set and of the mechanism of the trap when sprung, respectively.

A represents any suitable box, preferably sheathed with metal or wire and provided with a door A', through which the animals may be released or removed. This box is provided with braces $A^2$, $A^3$, and $A^4$, forming the framework for the operating mechanism, which braces may be arranged in any desired or convenient way.

B represents one of a plurality of wire-covered apertures for the admission of air and light, whereby the interior of the trap may be inspected when desired.

C represents a passage-way at the top of the box, which is closed near one end, as by the diaphragm $c$, carrying a hook $c'$, from which the bait is suspended.

D represents a pivoted chute transversely pivoted, as at $d$, and carrying the guide-rod D', connected thereto by the pin $d'$. Between this guide-rod D' and lower face of the chute D the wrist-pin $e$ of the bar E is held, which bar is provided with a plurality of holes $e^2$, through two of which the guide-staple $e'$ is secured, which guide-staple passes over the curved arm F', attached near the pivot $f$ to the armature-plate F. This plate F carries two rearwardly-extending arms $F^2$, terminating in the iron or steel bar $F^3$, which serves as an armature of the magnet G. This armature may be made heavy enough to counterbalance the plate F, if desired, or it may be weighted, as shown at $F^4$, whereby the armature-plate F will be balanced about its pivot. This magnet G is preferably a permanent horseshoe magnet secured in the box A in any convenient way.

H represents a lever pivoted, as at $h$, and provided with a projecting pin $h'$, adapted to be struck by the arm F' when the said arm is swung around to the right, as indicated in Figs. 3, 5, and 6. This lever H is connected by the rod H' to the lever $H^2$, having secured thereto a pawl $H^3$ and the stop $h^3$, which stop and pawl are rigidly attached to the lever $H^2$, and all three are pivoted, as at $h^2$. This pawl $H^3$ engages in one of the notches in the wheel K, while the stop $h^3$ is adapted to simultaneously check the motion of the fan M when the pawl $H^3$ engages in one of the said notches, and thus two independent stops for the clockwork mechanism operated by the spring L are provided.

P represents a pivoted frame or arm made fast to the shaft $k^0$, carrying the notched wheel K.

T and T' represent a series of interpenetrating teeth, which are pivoted, as at $t$, and are counterbalanced by the weight $t'$. These teeth may be counterbalanced by the said weight, as shown, and placed so that any upward pressure on the said teeth will cause the weight to strike the bottom of the upper chamber of the box A, and thus keep the passage-way between the said teeth permanently closed against upward pressure, or these weights may be normally supported on the bottom of the upper chamber of the box A, the preponderance of the said weights being just sufficient to always restore the teeth to the interpenetrating condition represented in Figs. 3, 5, and 6.

The operation of the device is as follows:

The animal, attracted by the bait on the hook $c'$, walks along the passage in the upper chamber C until his weight is sufficient to tilt the chute D downward about its pivot $d$. This downward motion of the chute D will drag the bar E with it, causing the arm F to swing the balanced armature-plate F about its pivot $f$, drawing the armature $F^3$ away from the magnet G, and just as soon as this armature is released the inertia of the moving parts will cause the plate F and chute D to swing down rapidly, dumping the animal on the interpenetrating teeth T and T', which yield, and the animal passes through into the lower chamber of the box, whence it is impossible for him to escape, the passage through which he came being closed against him by the teeth T and T', which immediately return to the position shown in Figs. 3, 5, and 6. As the arm F' swings over the right, in Figs. 3, 5, and 6, it strikes the pin $h'$, causing the lever H' to swing about its pivot and drawing up the rod H', and causing the lever $H^2$ to swing about its pivot $h^2$, and to withdraw the pawl $H^3$ from engagement with the wheel K, at the same time to withdraw the stop $H^3$ from the fan M. The clockwork mechanism operated by the coil-spring L is now set in motion, causing the shaft $k$ and the frame P, rigidly attached thereto, to swing in the direction of the arrow in Figs. 5 and 6. This frame P bears on the rod D, which in the meantime has reached the position shown in Fig. 6, and moves the chute D upward about its pivot $d$, while at the same time the bar E causes the arm F' to restore the armature-plate F to the horizontal position. The length of the frame P between the shaft $k^0$ and the roller $p$ is such that when the parts reach the position shown in Fig. 5 the frame P will keep on revolving until it has rotated through one hundred and eighty degrees, the notches $k$ in the wheel K being spaced one hundred and eighty degrees apart for this purpose, when the frame P will be simply turned end for end, and the parts will be in the position indicated in Fig. 5. The armature $F^3$ will hold the armature-plate F and the arm F' in the position indicated in Fig. 5, while the weight $d^2$ will keep the chute in the horizontal position. Thus it will be seen that the trap will set itself automatically after being once sprung, and thus sprung the automatic resetting will take place indefinitely as long as the energy started up in the spring L is sufficient for this purpose.

For a trap of ordinary construction the clockwork mechanism is so arranged that the trap may be sprung and reset from thirty to forty times, but this may be varied at will according to the size of the trap and the relative size of the animals to be caught, or according to other conditions that may prevail.

I provide two independent means for checking the motion of the clockwork in case either one should fail to operate, but only one such means will ordinarily be required and the other may be omitted, if desired.

It will be obvious that various modifications of the herein-described apparatus and of the several parts thereof might be made which could be used without departing from the spirit of my invention.

Having thus described my invention, what I claim, and desire to secure by Letters Patent of the United States, is—

1. In an animal-trap, the combination with a pivoted chute adapted to be tilted downward by the weight of the animal, of an armature-plate operated by the downward motion of the said chute, and clockwork mechanism operated by said armature-plate for restoring the parts to the initial position, substantially as described.

2. In an animal-trap, the combination with a pivoted chute weighted at the outer end and adapted to be tilted downward at the inner end by the weight of the animal, of a pivoted armature-plate operated by the downward motion of said chute, and mechanism operated by said armature-plate for restoring the parts to the initial position, substantially as described.

3. In an animal-trap, the combination with a pivoted chute weighted at one end and adapted to tilt downward at the other end due to the weight of the animal, of a pivoted armature-plate arranged above said pivoted chute, an armature connected to said armature-plate and adapted to normally hold the same in the horizontal position, a magnet attracting said armature, a bar and arm connected to said pivoted chute and said armature-plate, and mechanism operated by said bar for restoring the parts to the initial position when the trap is sprung, substantially as described.

4. In an animal-trap, the combination with a pivoted chute weighted at one end, of an armature-plate pivoted above said pivoted chute, an armature connected to said armature-plate, a magnet attracting said armature for connecting said pivoted chute and said armature-plate, and mechanism operated by the motion of the moving parts for restoring the parts to the initial position, substantially as described.

5. In an animal-trap, the combination with a pivoted chute adapted to tilt downward due to the weight of the animal, of a pivoted armature-plate arranged above said pivoted chute, an armature connected to said armature-plate and adapted to normally hold the same in the horizontal position, a magnet attracting said armature, a bar and arm connected to said pivoted chute and said armature-plate, and clockwork mechanism operated by said bar for restoring the parts to the initial position when the trap is sprung, substantially as described.

6. In an animal-trap, the combination with a pivoted chute weighted at one end, of an armature-plate pivoted above said pivoted chute, an armature connected with said armature-plate, a magnet normally holding said armature in place, and clockwork mechanism operated by the motion of the moving parts for restoring the parts to the initial position, substantially as described.

7. In an animal-trap, the combination with a box or case of a pivoted chute adapted to be tilted downward by the weight of the animal, a plate operated by the downward motion of the said chute, clockwork mechanism operated by said plate for restoring the parts to the initial position, and pivoted counterbalanced interpenetrating teeth placed beneath said chute, substantially as described.

8. In an animal-trap, the combination with a box or case of a pivoted chute weighted at the outer end and adapted to be tilted downward at the inner end by the weight of the animal, a pivoted armature-plate operated by the downward motion of said chute, mechanism operated by said armature-plate for restoring the parts to the initial position, and pivoted counterbalanced interpenetrating teeth placed beneath said chute, substantially as described.

9. In an animal-trap, the combination with a box or case of a pivoted chute weighted at one end and adapted to tilt downward at the other end due to the weight of the animal, a pivoted armature-plate arranged above said pivoted chute, an armature connected to said armature-plate and adapted to hold the same in the horizontal position, a magnet attracting said armature, a bar and arm connected to said pivoted chute and said armature-plate, mechanism operated by said bar for restoring the parts to the initial position when the trap is sprung, and pivoted counterbalanced interpenetrating teeth placed beneath said chute, substantially as described.

10. In an animal-trap, the combination with a box or case of a pivoted chute weighted at one end, an armature-plate pivoted above said pivoted chute, an armature connected to said armature-plate, a magnet attracting said armature, mechanism operated by the motion of the moving parts for restoring the said parts to the initial position, and pivoted interpenetrating teeth provided with counterpoise-weights and placed beneath said chute, substantially as described.

11. In an animal-trap, the combination with a pivoted chute, adapted to be tilted downward by the weight of the animal, of a plate operated by the downward motion of said chute, a rotary frame or arm for restoring the parts to the initial position, a spring rotating the same, and clockwork mechanism controlled by the moving parts and regulating the operation of said spring, substantially as described.

12. In an animal-trap, the combination with a pivoted chute weighted at the outer end and adapted to be tilted downward at the inner end by the weight of the animal, of a pivoted plate operated by the downward motion of said chute, a rotary frame or arm for restoring the parts to the initial position, a spring rotating the said frame or arm, and clockwork mechanism controlled by the chute, and regulating the operation of said spring, substantially as described.

13. In an animal-trap, the combination with a pivoted chute adapted to tilt downward due to the weight of the animal, of a pivoted armature-plate arranged above said chute, an armature connected to said plate, and adapted to normally hold the same in the horizontal position, a magnet attracting said armature, a bar and arm connected to said pivoted chute and said armature-plate, a rotary frame or arm for restoring the parts to the initial position when the trap is sprung, a spring rotating the said frame or arm, and clockwork mechanism controlled by the chute and regulating the operation of said spring, substantially as described.

14. In an animal-trap, the combination with a pivoted chute weighted at one end of an armature-plate pivoted above said chute, an armature connected to said plate, a magnet normally holding said armature in place, a rotary frame or arm for restoring the parts to the initial position, a spring rotating the said frame or arm and clockwork mechanism controlled by the chute, and regulating the operation of said spring, substantially as described.

In testimony whereof I affix my signature in presence of two witnesses.

WILLIAM HAMILTON HARDEN.

Witnesses:
CHAS. M. SHEFFIELD,
S. S. MEADOWS.